(12) United States Patent
Schubert

(10) Patent No.: US 7,462,820 B2
(45) Date of Patent: Dec. 9, 2008

(54) ISOTOPE SEPARATION PROCESS AND APPARATUS THEREFOR

(76) Inventor: Peter J. Schubert, 310 W. Greyhound Pass, Carmel, IN (US) 46032

( * ) Notice: Subject to any disclaimer, the term of this patent is extended or adjusted under 35 U.S.C. 154(b) by 557 days.

(21) Appl. No.: 10/906,886

(22) Filed: Mar. 10, 2005

(65) Prior Publication Data

US 2005/0199797 A1  Sep. 15, 2005

Related U.S. Application Data

(60) Provisional application No. 60/521,201, filed on Mar. 10, 2004.

(51) Int. Cl.
*B01D 59/44* (2006.01)
(52) U.S. Cl. .................. 250/283; 250/281; 250/282
(58) Field of Classification Search .......... 250/281–300
See application file for complete search history.

(56) References Cited

U.S. PATENT DOCUMENTS 4,751,393 A * 6/1988 Corey et al. .............. 250/492.2
6,946,667 B2 * 9/2005 Chen et al. .............. 250/492.21
7,107,929 B2 * 9/2006 Horsky et al. ......... 118/723 CB

* cited by examiner

*Primary Examiner*—Jack I Berman
*Assistant Examiner*—Andrew Smyth
(74) *Attorney, Agent, or Firm*—Hartman & Hartman, P.C.; Gary M. Hartman; Domenica N. S. Hartman

(57) ABSTRACT

A process and apparatus for separating element isotopes in space by imparting a velocity and direction to a body of material along a substantially linear path, heating and vaporizing the body and ionizing the material thereof as it flows along the path to produce a first stream comprising ionized material, and then using at least one aperture to separate a first portion of the ionized material having a velocity transverse to the path that exceeds a predetermined transverse velocity limit while a second portion of the ionized material passes through the aperture and can be subsequently collected.

25 Claims, 4 Drawing Sheets

ISOTOPE SEPARATION PROCESS AND APPARATUS THEREFOR

CROSS REFERENCE TO RELATED APPLICATIONS

This application claims the benefit of U.S. Provisional Application No. 60/521,201, filed Mar. 10, 2004.

BACKGROUND OF THE INVENTION

The present invention generally relates to the process of isotope separation, by which atoms of varying molecular weight can be differentiated.

Commonly-owned U.S. Pat. No. 6,614,018 to Schubert discloses an apparatus and process for continuous isotope separation in microgravity using solar power. Generally, Schubert's apparatus has axial symmetry and utilizes magnetic beam confinement to perform a continuous process in microgravity environments.

Several subfields relate to apparatuses and processes of the type taught by Schubert. One subfield is mass spectroscopy, wherein a sample is ionized and sputtered from the matrix being studied through bombardment by another ion such as oxygen or argon. A sample analyzer segregates isotopes through the application of a magnetic field. As ions of charge q, with a velocity v and mass m pass through a magnetic field of strength B, they experience a force perpendicular to the field direction according to the Lorentz force, F=qvxB (F is force vector, a is acceleration, m is mass, q is electron charge, v is velocity vector, B is magnetic field strength, and x is the cross product operator). This force causes an acceleration in a direction normal to the original velocity according to Newton's law a=F/m (a is acceleration and m is mass). Because different ions have different masses, the acceleration they receive is different. This effect is exploited to separate out the various elements and isotopes of the matrix under study. Suitable collectors monitor the amount of charge impinging at the location associated with various isotopes, providing an indication of their presence, and an approximate indication of their relative abundance. Previous work in the field of mass spectroscopy include U.S. Pat. No. 4,066,895 to Iwanaga, U.S. Pat. No. 4,174,479 to Tuithof et al., U.S. Pat. No. 5,220,167 to Brown et al., U.S. Pat. No. 3,443,087 to Robieux et al., and U.S. Pat. No. 3,772,519 by Levy et al. This technique of magnetic separation is widely used in many fields, as will be discussed below In the field of ion implantation, used typically for semiconductor manufacture and for impregnation of specialty materials, a gaseous molecule containing the element of interest is ionized using a radio frequency plasma. The plasma field causes dissociation of the molecule, and causes an excited state of the element to be implanted. All excited species of charge q are then accelerated using electrostatic fields of strength E according to the equation F=Eq. The accelerated ions are collimated and passed through a magnetic field to separate the various isotopes. A suitable shutter system is employed to select the ion of interest, which is then allowed to proceed toward the substrate to be implanted with this ion. However, along the beam path, between the separation magnet and the substrate, dynamic electric fields, oriented typically in two perpendicular directions to the beam axis, are employed to deflect the beam slightly. This deflection is used to cause the beam to be scanned across the substrate, typically with the desire to uniformly cover the substrate area. Once the beam arrives at the substrate, typically with a relatively high velocity and relatively low density, the ions will impinge upon the surface, and penetrate to a distance determined by the beam energy, the ion mass, the angle of incidence, and the atomic mass and crystal orientation of the substrate. Several patents in this area include U.S. Pat. No. 4,841,143 to Tamura et al., and U.S. Pat. No. 5,751,002 to Ogata et al.

Isotope separation, as a field of study, is principally used to enrich uranium with the isotope of atomic weight 235, relative to the much more abundant $U^{238}$. A number of patents in this field demonstrate a wide variety of techniques for achieving isotope enrichment, such as U.S. Pat. No. 3,935,451 to Janes, U.S. Pat. No. 3,940,615 to Kantrowitz, U.S. Pat. No. 4,202,860 to Miyake et al., U.S. Pat. No. 4,726,967 to Arendt et al., U.S. Pat. No. 5,024,749 to Snyder et al., U.S. Pat. No. 4,399,010 to Lyon et al., U.S. Pat. No. 5,422,481 to Louvet, U.S. Pat. No. 4,757,203 to Gil et al., U.S. Pat. No. 5,224,971 to Mukaida et al, and U.S. Pat. No. 3,953,731 to Forsen. Among the various techniques are those which use a linear direction of ion travel, and those which employ a spiral or cyclotron ion movement. In all cases, the uranium, or other element, such as zirconium, is first ionized using one of several different methods. The first broad class of ionization techniques involves first evaporating the material, and then ionizing it using radio-frequency (rf) energy or tuned laser radiation. Evaporation is accomplished with any of several techniques, such as Joule heating, laser bombardment or ion sputtering. Ionization with rf energy will typically excite all isotopes of the element of interest. However, with laser ionization, the frequency of radiation can be selected to preferentially ionize one isotope over another. This appears to be the preferred method in many patents, since it allows separation to be accomplished using electric fields, instead of magnetic fields, although both can be found in the patent records. Once the moving (linear or cyclotron) isotopes are ionized and separated by either electric or magnetic fields, they are collected at surfaces that are temperature controlled to allow condensation.

The application of very rugged coatings of metal or ceramic is the goal of thermal spray. In each form, the material to be deposited is supplied in a powdered form carried in a stream of gas, such as nitrogen. The small particles of material are plasticized, melted, or ionized, depending on the energy supplied. This energy may be from the combustion of a reactive fuel with oxygen or from an electric arc. The heated particles of metal or ceramic are then carried to the substrate to be coated by the carrier gas, or by the velocity of the exit gasses from combustion. These particles then coat the surface of the substrate, preferably with very little surface reaction, and typically produce a very dense coating. Representative patents in the field of thermal spray include U.S. Pat. No. 3,892,882 to Guest et al., and U.S. Pat. No. 5,716,422 to Muffoletto et al.

The principles of magnetohydrodynamics involve the motion of a charged medium through a magnetic field. In a typical embodiment, the momentum of the moving medium imparts a backward electromotive force which can be used for power generation. In another form, the magnetic field can be used to selectively alter the trajectories of the moving medium, which may be a plasma of ionized isotopes, for example. In this way, magnetohydrodynamics is similar in principle to mass spectroscopy. A patent describing this method is U.S. Pat. No. 4,737,711 to O'Hare. This patent also describes a method of element separation.

A materials processing environment in a circular orbit around a massive body is essentially in a free-fall, where the effects of static gravity, such as those felt on the surface of such a massive body, are not felt or are very small. Such a microgravity environment has certain advantages for materials processing. The sedimentation or settling of materials of varying densities in a suspension does not occur, allowing the formation of more homogenous materials in orbit than on the surface of a planet or planetoid. The relatively less stringent requirements for fixturing are another feature exploited in some patents on microgravity processing. A sample of microgravity processing patents is U.S. Pat. No. 5,196,999 to Abe.

Many methods for the separation of chemical elements or molecules in space have been proposed and studied. For the most part, these include the use of reagents, catalysts, and consumable chemicals which must be brought from a planet such as Earth, at great expense. Furthermore, the equipment for these processes tends to be very expensive and intricate, requiring significant maintenance. References to such schemes can be found in U.S. Pat. No. 4,737,711 to O'Hare (noted above), U.S. Pat. No. 5,374,801 to Leung, and U.S. Pat. Nos. 5,096,066 and 5,153,838 to Kindig.

BRIEF SUMMARY OF INVENTION

According to the present invention, there is provided a process and apparatus that achieves separation of multiple isotopes simultaneously using a pulsed, batch-type operation, and powered primarily using solar energy. The process entails separating element isotopes in space by imparting a velocity and direction to a body of material along a substantially linear path, heating and vaporizing the body and ionizing the material thereof as it flows along the path to produce a first stream comprising ionized material, and then using at least one aperture to separate a first portion of the ionized material having a velocity transverse to the path that exceeds a predetermined transverse velocity limit while a second portion of the ionized material passes through the aperture and can be subsequently collected. The apparatus includes means for imparting a velocity and direction to a body of material along a substantially linear path within an apparatus, means for heating and vaporizing the body and ionizing the material thereof as it flows along the path to produce a first stream comprising ionized material, and at least one aperture configured to separate a first portion of the ionized material having a velocity transverse to the path that exceeds a predetermined transverse velocity limit while a second portion of the ionized material passes through the aperture. According to certain aspects of the invention, heating and vaporizing of the body and ionization of the material thereof can be performed using concentrated sunlight and ionizing radiation, followed by electric field separation and collection of the desired isotopes in appropriate receptacles.

The process and apparatus of this invention allow flexibility of implementation, very high separation efficiency, and minimal waste when simultaneously collecting a multiplicity of isotopes, and can greatly reduce the cost of producing purified finished materials in space. This capability makes economical the fabrication of complex and large structures for space-based industry and habitation. The output stream of pure isotopes can be directed, focused, and shuttered to allow the creation of composite materials, superlattices, or three-dimensional structures of almost any atomic and spatial configuration.

Other objects and advantages of this invention will be better appreciated from the following detailed description.

DETAILED DESCRIPTION OF THE INVENTION

Figure 1:
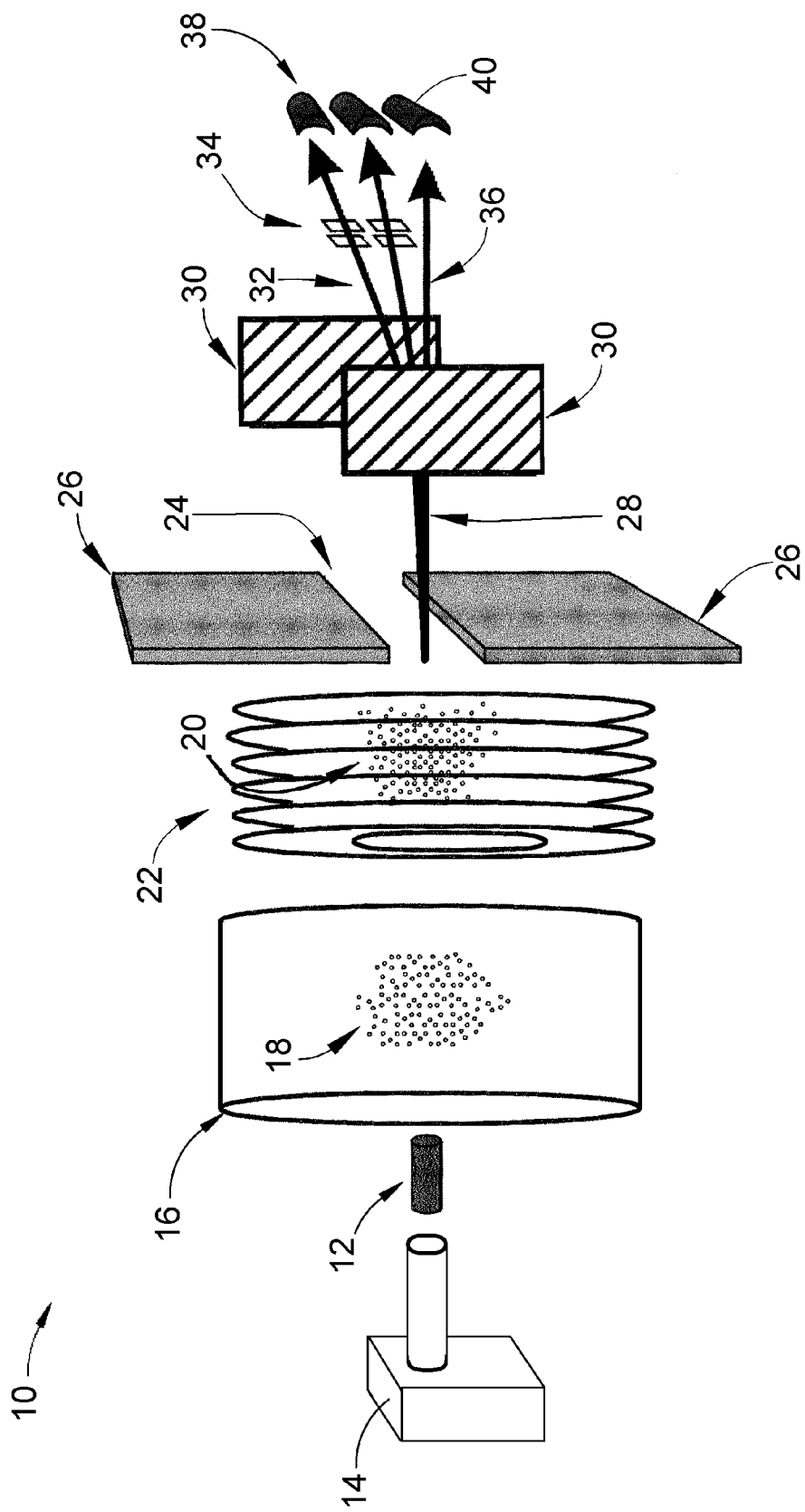
FIG. 1 represents an embodiment of the present invention, in which kinetic energy is imparted to a slug that is then vaporized, ionized, separated and finally collected.

The present invention involves a process in which a body or slug of material, such as cored rock or formed minerals, is given a velocity and directed on a substantially linear path. This velocity may come from an electromagnetic catapult (also called a rail gun or a mass driver), or from a device employing stored mechanical energy such as a sling or catapult, or from a device using the rapid expansion of materials such as a cannon. Once the slug is given a velocity, it is heated very quickly to vaporize the material, a state in which molecular bonds within the matrix are broken to liberate individual elements as atoms. The heat for vaporization may come from concentrated sunlight or laser irradiation. The vaporized elements are now ionized using radio-frequency ionization and/or laser irradiation to form a plasma. Though the linear velocity of the slug is conserved by the ionized elements, the thermal expansion of the vaporization process will cause radial spreading of the material relative to the original direction of motion. One or more apertures are then used to narrow the cross section of the stream of vaporized materials.

The vaporized elements exiting the aperture may then pass through an electric field formed transverse to the direction of the motion of the particles. As the charged elements pass through the electric field, they experience a transverse velocity proportional to their charge and inversely proportional to their mass. This transverse velocity, when added to the initial linear velocity, deflects the various elements to a differing degree. Additional electric fields, oriented longitudinally to the direction of the beams of separated elements may be used to reduce their velocity. Appropriately placed collection receptacles collect the separated and purified elements, the primary output of the current invention. Thermal control of the receptacles removes the waste heat.

A sufficient vacuum environment is needed for the operation of the present invention. Upon collection of the separated elements, and allowing for possible re-charging of the power sources for the vaporization, ionization and separation, the process is repeated with another slug of rock or material. Through this method of pulsed operation, the necessity for beam confinement is reduced or eliminated. Further advantages of pulsed operation are that there is no requirement to accelerate the ions electrically in a longitudinal direction, and this process can be used either in orbit or on the surface of a planetoid with sufficient vacuum.

Perceived inefficiencies in the operation of the present invention can be used to advantage. For example, the apertures may be formed of other slugs of rock or mineral, so they collect waste material which can be fed again into the process. As another example, the un-ionized portion of the material stream, which does not experience a transverse velocity, may be collected as a hard slag. The slag can be collected on a movable working surface so that the shape of the slag can be controlled. These bricks of slag material can be used for construction of habitats and other structures, and have the benefit of providing radiation shielding to any human occupants of those habitats.

In view of the above, significant advantages of this invention include the capability of separating materials without the use of reagents, catalysts, consumable chemicals, or reaction vessels, and using an apparatus that can require very little maintenance. Furthermore, the present invention makes use of heating, ionization, and collection techniques that can be used in combination with known processing techniques, such as magnetic separation and dynamic scanning to select specific isotopes.

Also in view of the above, the present invention provides numerous benefits for space-based manufacturing of in-space materials as well as waste materials from spacecraft and human habitation. Any material can be fed into the apparatus for separation into purified elements. Every element can, in theory, be separated from every other to make the present invention a nearly universal recycling device. The purified raw materials from the collection receptacles can be further processed to fabricate many of the components of the present invention, thus approaching a von Neumann machine which can replicate itself. A near-geometric growth in output can be used advantageously to lower initial launch costs, thereby making the process more economically attractive than competing methods of in-space materials separation. The lack of requirements for externally supplied reagents, the reliance upon power from the Sun, and the lack of moving parts provide for very low operating costs and low maintenance costs. Pulsed operation make this process suitable as a flexible component of an integrated raw material extraction system. It is expected that the realization and implementation of the apparatus and process will greatly facilitate advances in human utilization and colonization of space.

FIGS. 1 through 4 represent an apparatus 10 and process for isotope separation in accordance with the above, by which atoms of varying molecular weight are differentiated. The apparatus 10 and process use a pulsed operation capable of separating one or more elements, and potentially all elements, contained in a slug of input material. The process and apparatus 10 is particularly adapted for use in space applications, typically in low-gravity environments (e.g., the Moon) and microgravity environments (e.g., orbital), though uses in higher gravity environments are also within the scope of this invention. With reference to FIG. 1, the principle of operation of the apparatus 10 is to first impart a velocity to a slug 12 of material. The slug 12 may be cored from a rocky body such as an asteroid or the Moon. The slug 12 may also be formed by pressing regolith into a given shape, or it may be waste materials that have been pre-processed and formed into a given shape. The shape of the slug 12 is preferentially a sphere or cylinder. The slug 12 should have sufficient structural integrity that it will survive the acceleration process of imparting a velocity. Velocity may be imparted to the slug 12 using, for example, an electromagnetic rail launcher 14 (also called a mass driver or electromagnetic catapult, or a rail gun) depicted in FIG. 1. In a typical rail launcher design well known in the art, a body to be launched (such as the slug 12) is placed within a holding device or fixture attached to a conductive bar. The bar forms a moveable fourth side of a rectangular loop of conductors, and when a current is passed through the loop, the bar is pushed out of the rectangular loop. As the bar exits the rectangular loop, the holding device becomes detached from the slug 12. Through inertia, the slug 12 will continue in a substantially linear direction out from the rail launcher 14. Other means of imparting velocity are also envisioned, for example, a spring-loaded catapult can be used to throw the slug 12 with a linear velocity. Such a mechanical catapult may be linear, or it may be radial, in which case the slug 12 is thrown at a tangent. Another means of imparting velocity is to use the acceleration of gravity by dropping the slug 12. A number of other means by which a body can be accelerated and given a velocity are also within the scope of the present invention.

After leaving the launcher 14, the moving slug 12 is heated to break the molecular bonds which may exist within the matrix of the slug material and then vaporize the individual elements to form a cloud 18 of vaporized material. Concentrated sunlight, through the use of concentrating mirrors or lenses 16 (one of which is represented in FIG. 1) can be used to vaporize the moving slug 12. Alternatively, a plurality of energetic lasers may be used to vaporize the slug 12 either alone or in tandem with the concentrated sunlight from the mirrors or lenses 16. Other means of vaporizing material, such as plasma etching, irradiation, electromagnetics or mechanical impact may be used instead of concentrated sunlight or lasers. In the preferred embodiment, the mirror or lenses 16 generate concentrated sunlight with a focal line co-linear with the path of the moving slug 12. A focal line may also be formed through the concentrating action of a mirror with a half-cylinder cross section, or an extruded parabolic shape. It is preferred that the sunlight or laser irradiation be substantially radially symmetric, to the extent practical through the fixturing of the mirrors or lasers.

Vaporization of the slug 12 causes an expansion of the volume of the material. However, the individual atoms within the vapor cloud 18 will still retain the substantially linear momentum of the initial velocity of the slug 12. The vaporized atoms within the expanding cloud 18 will continue moving in the initial direction of the slug 12, so that the volume occupied by the vaporized cloud 18 forms a cone. It is believed that some fraction of the slug 12 material may not vaporize fully. Whether through insufficient heat of vaporization from concentrated sunlight, or imperfect heating with lasers, there may exist intact molecules within the vapor cloud 18. To maximize the efficiency of the process, it is desired to vaporize as much of the slug material as possible. However, increasing the solar or laser energy to vaporize minerals with especially high heats of vaporization also increases the expansion of the vapor cloud 18. There exists a family of operating curves which trade off the percent vaporization and the rate of expansion of the vapor cloud 18. Considered together with the initial velocity of the slug 12, there may be various operating conditions which maximize certain metrics, such as purity of the separated elements or throughput flux.

Simultaneously with, or shortly after, the vaporization of the slug 12, the individual atoms within the vapor cloud 18 are ionized. As known in the art, ionization is the process of stripping away one or more of the electrons from the outer shell of the atom or molecule. While the vaporization process will likely ionize a fraction of the elements, a further ionization step is preferred to increase the ionization percentage. FIG. 1 depicts a radio-frequency (rf) source 22 of electromagnetic energy as being used to ionize the atoms within the vapor cloud 18, forming a plasma cloud 20. The rf source 22 may have a single frequency (such as 13.56 MHz), or a broad spectrum of frequencies designed to preferentially ionize certain elements such as silicon, iron, aluminum and oxygen. Laser energy can also be used for ionization, where the laser frequency is tuned to preferentially ionize certain elements. Either or both rf and laser ionization may be used.

Ionization of the vapor cloud 18 to create the plasma cloud 20 creates even more expansion of the material through such processes as thermal diffusion, self-scattering, electrostatic repulsion, and self-induction. As with the vaporized atoms within the expanding vapor cloud 18, the ionized atoms within the plasma cloud 20 continue moving in the initial direction of the slug 12, so that the volume occupied by the plasma cloud 20 forms a cone. Increasing the ionization frequency and energy will increase the percentage of ionization of the elements, but will also cause the cone of material to expand even more rapidly. There exists a tradeoff between ionization energy and frequency with the spread of material. Similar to the discussion regarding vaporization, there may exist several operation points which optimize different metrics such as purity of the finished product or throughput capacity of the process.

Figure 3:
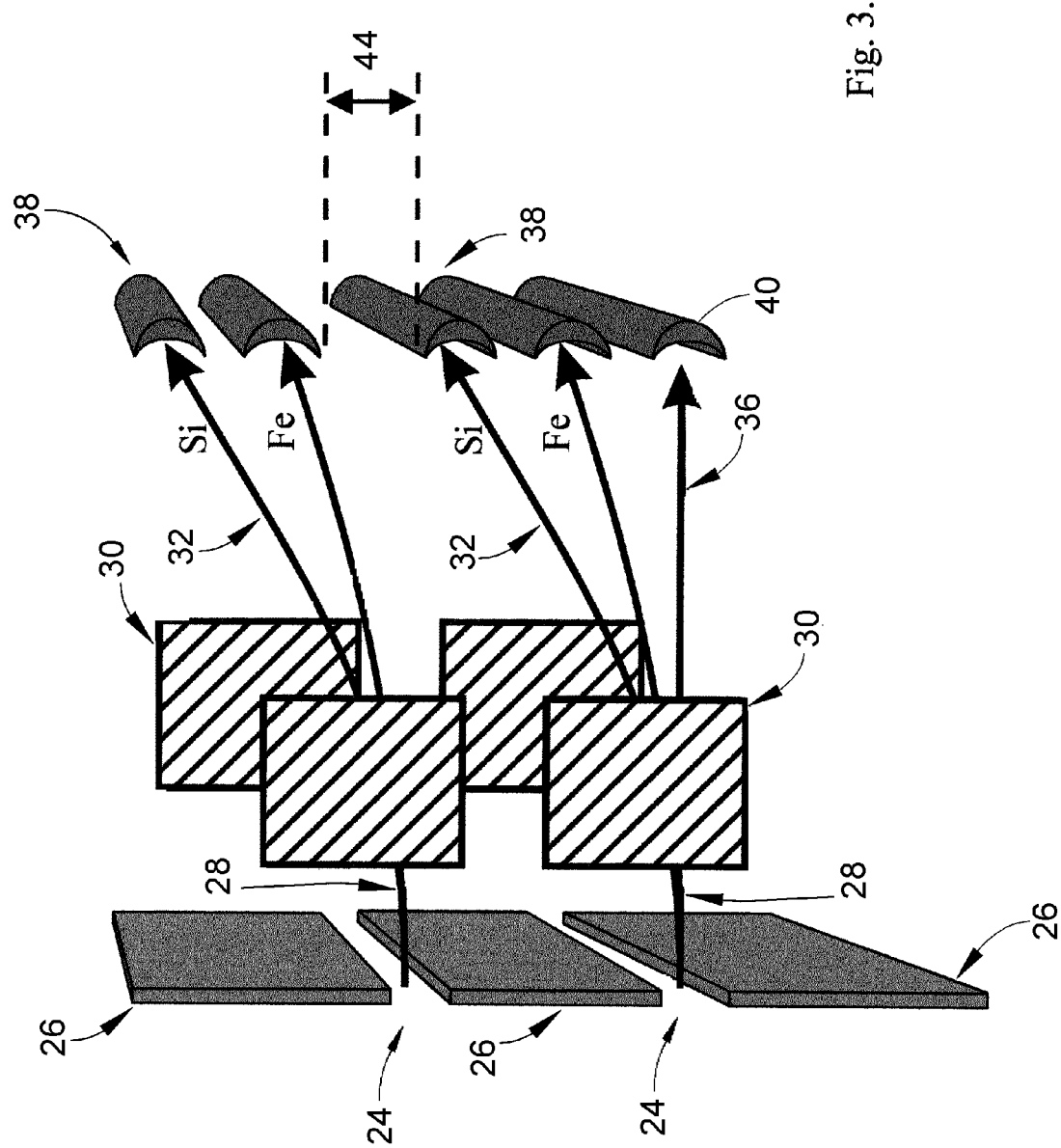
FIG. 3 represents an embodiment of the invention using multiple apertures that are positioned to avoid cross-contamination between the separated output from each aperture.

The expanding cloud 20 of ionized material will contain a plurality of elements, with a wide range of velocity components perpendicular to the original direction of motion of the slug 12. To achieve good separation of the materials, it is desired that the perpendicular expansion rate of the ionized elements be small compared to their linear velocity from the original slug 12. As this may be a practical challenge in certain operating conditions, it is advantageous to limit the dimensions of the cloud 20 of material in at least one direction. This limiting can be accomplished by a slit or aperture within or between some solid material. In the embodiment of FIG. 1, the cloud 20 of ionized plasma encounters a rectangular-shaped aperture 24 defined by two panels 26, so that the material exiting the aperture 24 is an ion beam 28 limited in the direction of the short dimension of the rectangular shape of the aperture 24. While the use of a single aperture 24 is represented in FIG. 1, FIG. 3 represents an embodiment in which a plurality of slits or apertures 24 are used to maximize the usage of ionize materials and achieve greater throughput. The multiple apertures 24 of FIG. 3 are shown spaced appropriately to the separation of elements, to prevent cross-contamination between ionized materials that have passed through adjacent apertures 24.

Downstream of the aperture(s) 24, the rectangular cross-section beam 28 is passed between substantially parallel plates 30 of a conductive material. With a voltage applied from one plate 30 with respect to the other, an electric field is formed in the space between the plates 30. As the charged, ionized elements encounter the electric field, they experience a force proportional to the field strength, proportional to the charge state of the ion, and inversely proportional to the mass of the element. With a uniform electric field, the force on each atom is directly proportional to the charge-to-mass ratio of the atom. The orientation of this electric field is oriented with the long dimension of the aperture 24, so that the force upon each ion is transverse to the direction of motion of the original slug 12. With this new component of velocity, the ions are deflected to different extents according to their charge-to-mass ratio. The differing degrees of deflection now allow the ion beam 28 to be separated into a plurality of ion beams 32, each having a different element in a different charge state.

The thermal energy of these separated ion beams 32 will be high. To remove some of this energy, the present invention allows for a second electric field, shown in FIG. 1 as being produced by transverse electric field plates 34. The plates 34 is arranged so that the second electric field is oriented in a reverse direction to the direction of the separated ion beams 32, and thus works to decelerate the ions, effectively cooling them and slowing their velocity.

Collection receptacles 38 are shown in FIG. 1 as placed at appropriate places in the path of the plurality of ion beams 32. The receptacles 38 may be simply planar substrates of metal or ceramic that collect the desired elements from the separated beams 32. Pre-coating each receptacle 38 with the element to be collected will reduce interaction between the beam 32 and its receptacle 38. A wide range of collection receptacle technologies are envisioned by this invention, including but not limited to cryogenic cooling, direct-write ion beam technology, ion implantation, mass spectroscopic analysis, cyclotron separation for even greater purity refinement, oblique angle collection to distribute heat, dissolvable substrates, and prepared thin films for creation of superlattices or composite materials. A further preferred feature of this invention is to provide goniometer and translation stages in the collection process, allowing for rotational and translational movement of the collection receptacles 38. Through appropriate movement, direct writing of elements can be effected onto any conceivable surface. By combining such movement with further apertures (not shown) nearly any conceivable structure, device or component can be created with the invention.

Cooling of the ion beams 32 with the reverse electric field facilitates the collection of gaseous components of the slug matrix, such as oxygen and nitrogen which are best stored as a liquid. Reducing the thermal energy of the separated ions beams 32 also reduces the requirements for heat dissipation from the receptacles 38, providing greater flexibility in the design of the receptacles 38.

While it is desired to have complete vaporization of the slug 12, and complete ionization of the vapor cloud 18, in practice these fractions will be less than 100%. The portion of the slug 12 material which is not vaporized or ionized, having no net electric charge, will pass undeflected through the transverse electric field plates 34. This material will generally be in the form of a slag stream 36 containing a mix of elements. The material within the slag stream 36 may be formed into useful shapes through the movement of one of the receptacles 38, designated as a slag collection receptacle 40. Bricks, slabs, and other components needed to build structures may be formed from the slag. For human habitats, these slag bricks can be used both for structural integrity as well as radiation shielding.

Figure 2:
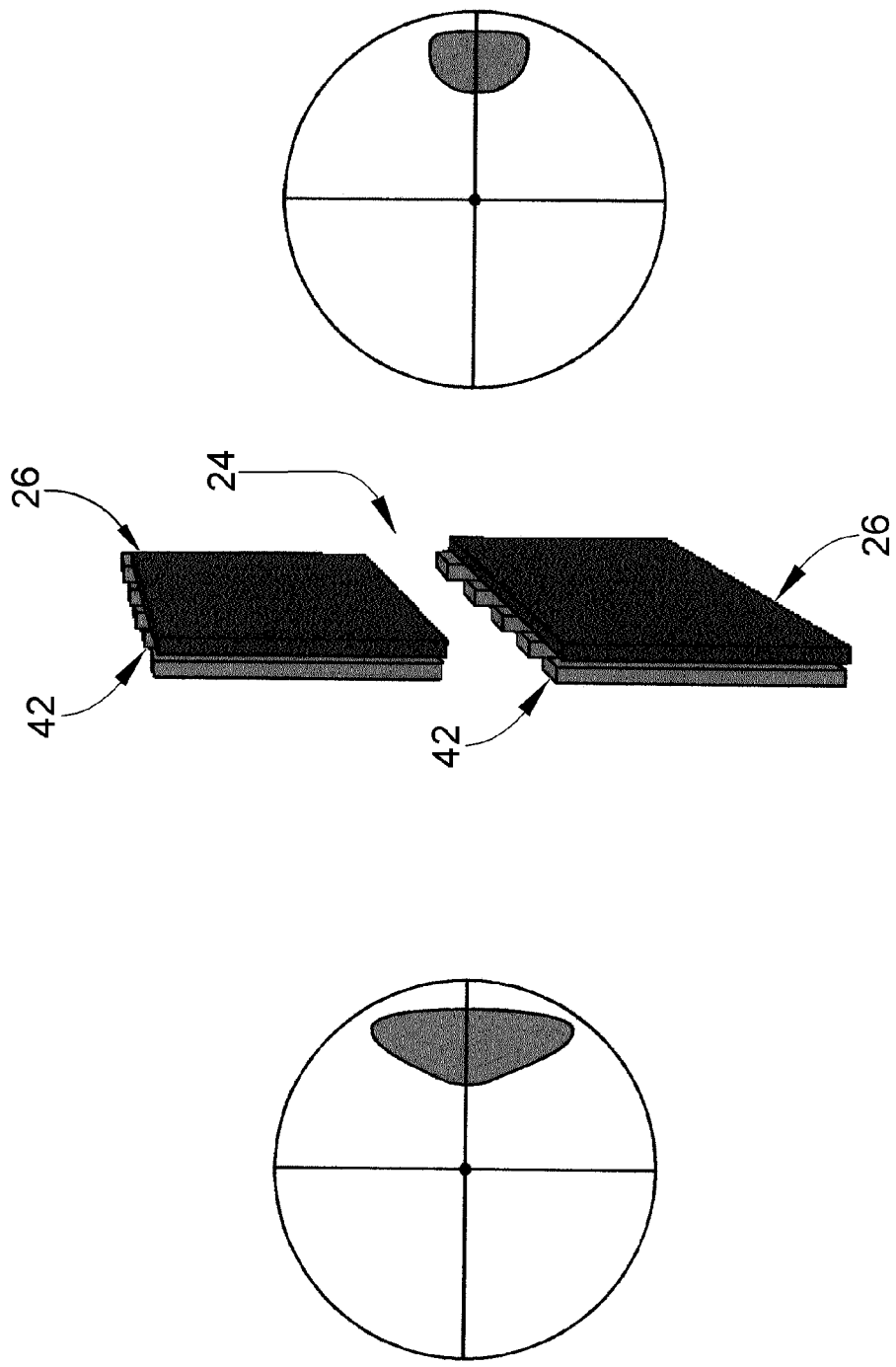
FIG. 2 is a more detailed depiction of an aperture design exemplifying the restriction of beam velocities to achieve greater purity of the separated elements; and re-use of the aperture material to reduce waste.

In FIG. 2, the panels 26 and their aperture 24 are shown in greater detail in order to demonstrate certain features of the invention. The purpose of the aperture 24 is to provide a beam 28 of roughly rectangular cross section having one relatively narrow dimension for the purposes of improving the purity of the separated elements. If the beam 28 were an ideal beam, with the narrow dimension approaching a line, the particles within the beam 28 would have equal velocities which are co-linear. When these charged particles encounter the transverse electric field of the plates 30, they will experience a transverse acceleration from the electric field in the amount of $a=qE/m$ (a is acceleration vector, E is electric field strength vector, and m is particle mass). For a length of travel L through the transverse electric field, the transverse velocity component dv will be $dv=qEL/mv$, where v is the original velocity. The linear separation of the ion beams 32 will then increase according to this velocity.

In a practical beam, the dimension of the aperture 24 is finite and larger than zero, and the particle velocities will have a distribution of values. Furthermore, because of the vaporization and ionization processes, some of the beam particles will have velocities at random angles to the primary beam direction. The polar plot on the left side of FIG. 2 illustrates this two-dimensional distribution of velocity. The circle indicates angle to the primary beam direction, traveling to the right in all the figures. At the origin of the circle is a dot representing zero velocity. The circumference of the circle represents a large velocity. The shaded region indicates the approximate distribution of velocities and angles in a practical beam just after the ionization step in the process. Upon encountering the aperture 24, particles having a velocity with angle far from the primary beam direction will be stopped, and removed from the beam 28. The second polar plot indicates this narrowing of the distribution of velocities, where the shaded region is limited in the angular component.

The importance of limiting the angular components of the ion beam 28 can be understood by considering the separation of each isotope beam 32. Consider two particles which are different elements, for example Si (silicon having atomic weight of 28) and Fe (iron having atomic weight of 52). Assuming both exist in a singly-ionized state for simplicity of the description, the Si particle will be deflected approximately twice as much as the Fe particle because of its smaller mass. However, if the Fe particle already possesses a transverse velocity from processing of the beam 28, it may travel in the transverse direction an amount equal to the deflection of a Si particle having an initial velocity co-linear with the primary beam direction. In this example, both particles will arrive at the receptacle 38 designated to collect silicon. The Fe particle will be an unwanted contaminant.

A small aperture 24 will minimize this cross-contamination of the isotopes. However, a small aperture 24 will, in general, have a lower throughput than a larger aperture 24 which can support a larger flux. Therefore, an engineering tradeoff exists between purity and throughput. For the purposes of this invention, either end of the spectrum of purity versus throughput may be desirable depending on the purposes to which the output is being produced. Silicon solar cells demand high purity, while structural metals may be more tolerant of contaminants but favor high throughput to keep per-unit costs low. The entire spectrum of this tradeoff is considered covered by the present invention.

Also shown in FIG. 2 is the use of undersized slugs 42 placed in front of each aperture panel 26. These undersized slugs 42 collect the stopped beam elements having large transverse velocities. The addition of this material will increase their dimension, so they can be used in subsequent processing as input to the entire process. These slugs 42 can also be used as structural components, as has been described for the slag in FIG. 1.

FIG. 3 shows a further adaptation of the invention intended to increase the throughput of the process. As discussed above, FIG. 3 depicts the use of multiple apertures 24 instead of a single aperture 24. Each aperture 24 is spaced apart by a gap 44 that prevents cross-contamination of ion beams 28 coming through adjacent apertures 24. The use of multiple apertures 24 is not likely to double the throughput, since the bulk of the material should be substantially co-linear with the primary beam direction. The slag stream 36 of un-ionized material will travel through a primary aperture 24, shown as the bottom aperture 24 in FIG. 3. However, for beam components with a substantial transverse velocity, the second aperture 24 may allow separation and collection of additional components.

Figure 4:
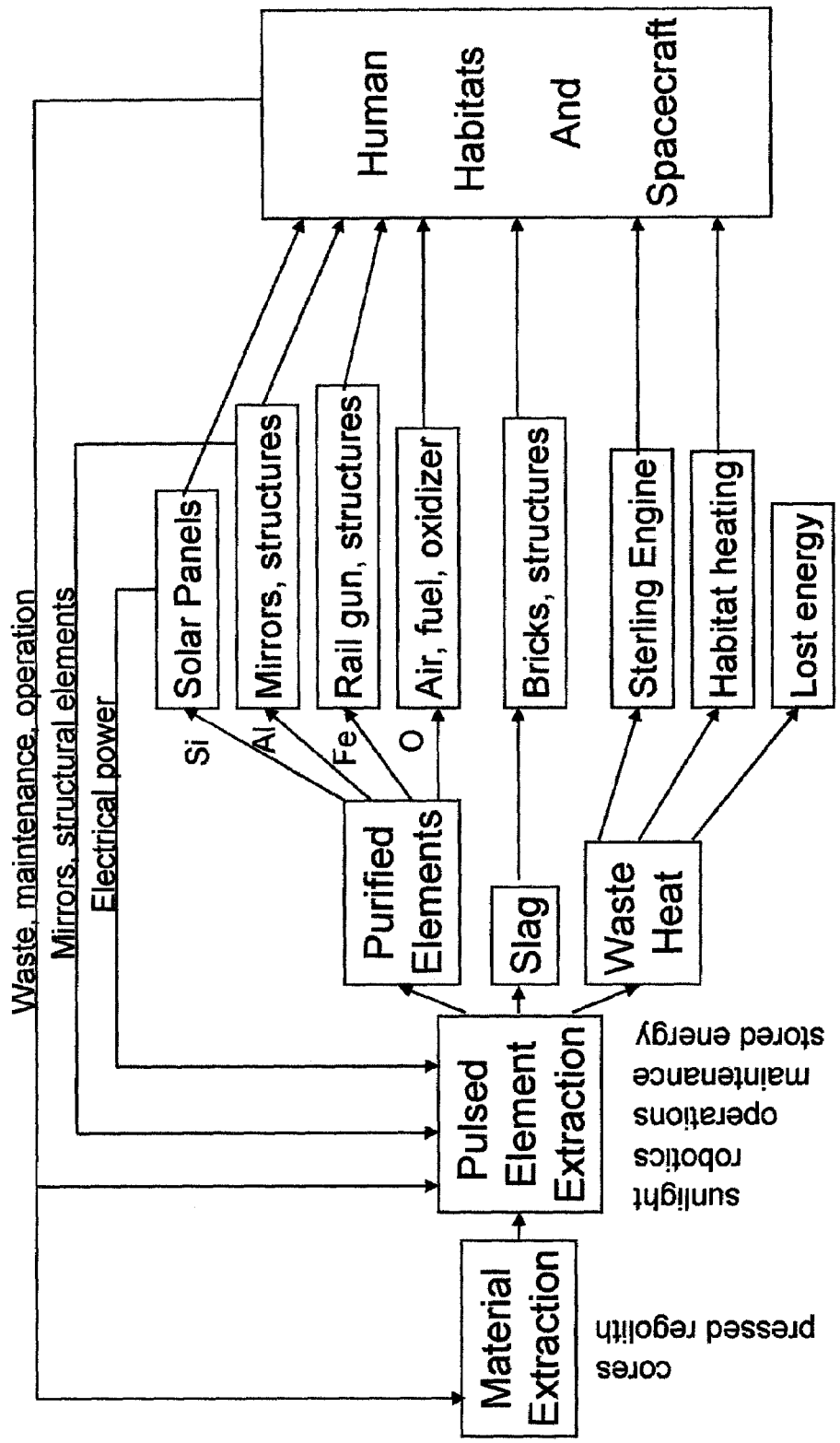
FIG. 4 represents the present invention as a component of a system architecture for energy production, materials handling and human habitation in a low or microgravity environment.

FIG. 4 shows the architecture of a system oriented towards human habitation, spacecraft fabrication, and energy production based on the present invention. Beginning on the left side of FIG. 4, raw materials are extracted from a planetary body or a planetoid, or eventually from waste materials. Slugs 12 of this raw material are fed into the pulsed isotope separator 10 of this invention (e.g., FIG. 1). Outputs of the isotope separation process are purified elements like silicon, iron, aluminum (Al), and oxygen (O), un-ionized slag 36, and waste heat. The purified silicon can be further processed to make solar cells. Aluminum can be used as a structural material for habitats, spacecraft and antennae, and can also be evaporated onto surfaces to make high-quality mirrors for concentrating sunlight, such as might be used in the vaporization portion of the present invention. A further use of aluminum is in wiring, which might be needed for electrical connections among the solar cells. Iron can be used as a structural material, or as components of a rail gun, such as that used as the velocity-imparting mechanism of FIG. 1. Oxygen is an important component of a safe, breathable atmosphere within habitats or spacecraft, and can also be used as an oxidizer in chemical processes such as fuel cells.

Slag 36 produced by the process of this invention can be used to make bricks or structural elements, as explained above. Waste heat taken from the collection receptacles 38 will be considerable, and can be utilized to realize further benefits. The Sterling engine is a reciprocating device which can use a difference in the heat of two environments to produce useful work. With the waste heat from the present invention as the high-temperature environment, and a suitable thermal mass exposed to the ambient temperature of space, for example, a Sterling engine could find great many uses within a human habitation. Waste heat can also be used directly for heating the habitat.

Using all these products as applied to a habitat or spacecraft fulfills many of the essential requirements for supporting humans in space or on the surface of a planetary body. By making it easier and more convenient for humans to live in space, they can in turn operate and maintain the isotope separator 10 and its associated infrastructure. With the advantages realized by the present invention, and further utilization of its outputs, human activities in space can approach the point of self-sustainability.

In view of the preceding description, it can be appreciated that the present invention differs from the teachings of commonly-owned U.S. Pat. No. 6,614,018 to Schubert. For example, the operation of the present invention is inherently pulsed or periodic, and not continuous, as a result of the processed material being in the form of bodies or slugs that are individually launched into the apparatus 10, as opposed to a continuous stream of particulate material. Also, the present invention is intended for use in environments of any gravity field, not just a microgravity environment. Another distinction is that the present invention relies on time-of-flight and apertures 24 to restrict the beam cross section, and while a magnetic beam confinement technique may be used, this is not a requirement. Another notable characteristic of the present invention is the lack of an axis of symmetry. These distinctions are believed to make the present invention more suitable for operation on the surface of a planetary body, such as the Moon, Mars, etc.

The description above, related to the pulsed isotope separation apparatus 10 and its associated process in the vacuum of space explains in detail the theory, operation, and design of this invention. In the text above, numerous additional improvements, options, and embodiments are referred to for the purpose of improving various facets of the useful application of this invention. The technologies involved in this invention span a wide range of human endeavor, and as such draw upon the excellent prior work of many others. It is hoped that anyone skilled in one or more of these various arts will be encouraged to test the combinations and alternatives enumerated and suggested in the detailed description. The lack of figures for every possible alternative in no wise implies that these are not considered part and parcel of this invention. Rather the intent is to present the basic concepts, key features and design considerations.

Therefore, while the invention has been described in terms of a preferred embodiment, it is apparent that other forms could be adopted by one skilled in the art. Accordingly, the scope of the invention is to be limited only by the following claims.

What is claimed is:

1. A periodic process for isotope separation comprising the steps of:
    imparting a velocity and direction to a solid body of material along a linear path within an apparatus;
    heating and vaporizing the solid body and ionizing at least some of the material thereof as it flows along the path to produce a first stream comprising ionized material;
    using at least one aperture to separate a first portion of the ionized material having a velocity transverse to the path that exceeds a predetermined transverse velocity limit while a second portion of the ionized material passes through the aperture;
    deflecting at least some of the second portion of the ionized material from the path to define at least a first deflected ion stream having a deflection orientation and angle away from the path; and then
    collecting the ionized material of the first deflected ion stream.

2. A process according to claim 1, wherein the second portion of the ionized material continues on the path downstream of the aperture prior to the deflecting step.

3. A process according to claim 1, wherein the deflecting step further defines at least a second deflected ion stream having a deflection orientation and angle away from the path that differs from the deflection orientation and angle of the first deflected ion stream as a result of the ionized material of the second deflected ion stream having a different charge or mass than the ionized material of the first deflected ion stream.

4. A process according to claim 1, wherein the deflecting step results in an undeflected stream containing un-ionized material that was not deflected during the deflecting step.

5. A process according to claim 4, wherein the undeflected stream continues traveling on the path following the deflecting step.

6. A process according to claim 5, further comprising the step of collecting the undeflected stream so as to form a plurality of structural elements therewith, and then forming a structure with the structural elements.

7. A process according to claim 1, wherein the first deflected ion stream is slowed prior to ionized material thereof being collected.

8. A process according to claim 1, wherein the first portion of the ionized material is collected on a surface adjacent the aperture.

9. A process according to claim 8, wherein the surface defines at least a portion of the aperture.

10. A process according to claim 1, wherein the using step utilizes at least a second aperture to separate a third portion of the ionized material while a fourth portion of the ionized material passes through the second aperture.

11. A process according to claim 1, wherein the first portion of the ionized material is separated with the at least one aperture as the ionized material of the first stream travels along the path.

12. A process according to claim 1, wherein the process is conducted in a low-gravity or microgravity environment.

13. A process according to claim 1, wherein the ionized material of the first deflected ion stream is a purified element.

14. A process according to claim 1, further comprising the step of obtaining the solid body from sources chosen from the group consisting of planetary bodies other than the Earth, planetoids, and the first portion of the ionized material.

15. A process according to claim 1, wherein the ionized material of the first deflected ion stream is collected on a surface of a receptacle.

16. An isotope separator for performing a periodic isotope separation process, the isotope separator comprising:
    means for imparting a velocity and direction to a solid body of material along a linear path within an apparatus;
    means for heating and vaporizing the solid body and ionizing the material thereof as it flows along the path to produce a first stream comprising ionized material; and
    at least one aperture configured to separate a first portion of the ionized material having a velocity transverse to the path that exceeds a predetermined transverse velocity limit while a second portion of the ionized material passes through the aperture;
    means for deflecting at least some of the second portion of the ionized material from the path to define at least a first deflected ion stream having a deflection orientation and angle away from the path; and then
    means for collecting the ionized material of the first deflected ion stream on a surface.

17. An isotope separator according to claim 16, wherein the aperture is aligned with the path so that the second portion of the ionized material continues on the path downstream of the aperture prior to encountering the deflecting means.

18. An isotope separator according to claim 16, wherein the deflecting means further defines at least a second deflected ion stream having a deflection orientation and angle away from the path that differs from the deflection orientation and angle of the first deflected ion stream as a result of the ionized material of the second deflected ion stream having a different charge or mass than the ionized material of the first deflected ion stream.

19. An isotope separator according to claim 16, wherein the deflecting means yields an undeflected stream containing un-ionized material that was not deflected during the deflecting step.

20. An isotope separator according to claim 19, wherein the deflecting means causes the undeflected stream to continue traveling on the path.

21. An isotope separator according to claim 20, further comprising means for collecting the un-ionized material from the undeflected stream downstream of the deflecting means.

22. An isotope separator according to claim 21, further comprising means for slowing the first deflected ion stream upstream of the collecting means.

23. An isotope separator according to claim 16, further comprising a surface adjacent the aperture on which the first portion of the ionized material is collected.

24. An isotope separator according to claim 23, wherein the surface defines at least a portion of the aperture.

25. An isotope separator according to claim 16, further comprising at least a second aperture configured to separate a third portion of the ionized material while enabling a fourth portion of the ionized material to pass therethrough.

* * * * *